(12) United States Patent
Hauck et al.

(10) Patent No.: US 10,696,062 B2
(45) Date of Patent: Jun. 30, 2020

(54) METHOD FOR COMPENSATING FOR DEFECTIVE PRINTING NOZZLES IN AN INKJET PRINTING MACHINE

(71) Applicant: HEIDELBERGER DRUCKMASCHINEN AG, Heidelberg (DE)

(72) Inventors: Axel Hauck, Karlsruhe (DE); Martin Mayer, Ladenburg (DE); Ilias Trachanas, Plankstadt (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 16/251,898

(22) Filed: Jan. 18, 2019

(65) Prior Publication Data

US 2019/0255861 A1 Aug. 22, 2019

(30) Foreign Application Priority Data

Feb. 19, 2018 (DE) .................. 10 2018 202 467

(51) Int. Cl.
| | |
|---|---|
| *B41J 2/205* | (2006.01) |
| *B41J 2/21* | (2006.01) |
| *H04N 1/401* | (2006.01) |
| *B41J 29/393* | (2006.01) |
| *B41J 2/045* | (2006.01) |
| *B41J 25/00* | (2006.01) |

(52) U.S. Cl.
CPC ........... *B41J 2/2139* (2013.01); *B41J 2/0451* (2013.01); *B41J 2/2146* (2013.01); *B41J 29/393* (2013.01); *H04N 1/4015* (2013.01); *B41J 2025/008* (2013.01)

(58) Field of Classification Search
USPC ...................................... 347/15, 12
See application file for complete search history.

(56) References Cited

U.S. PATENT DOCUMENTS

| | | | |
|---|---|---|---|
| 7,201,462 | B2 | 4/2007 | Shibata et al. |
| 7,607,752 | B2 | 10/2009 | Childers et al. |

(Continued)

FOREIGN PATENT DOCUMENTS

| | | |
|---|---|---|
| DE | 60302188 T2 | 7/2006 |
| DE | 102014219965 A1 | 4/2016 |

(Continued)

*Primary Examiner* — Lam S Nguyen
(74) *Attorney, Agent, or Firm* — Laurence A. Greenberg; Werner H. Stemer; Ralph E. Locher (57) ABSTRACT

A method for compensating for defective printing nozzles in an inkjet printing machine by way of a computer. Defective printing nozzles are compensated for by an increased ink drop volume of neighboring printing nozzles and the real positions of the print dots of all printing nozzles are determined and, to compensate for a printing nozzle failure, the required ink drop volumes of the respective neighboring printing nozzles are calculated for every printing nozzle as a function of the real positions of the print dots of the respective neighboring printing nozzles. In addition to increased ink drop volumes of the respective neighboring printing nozzles, reduced ink drop volumes are calculated for the respective next but one printing nozzles and all ink drop volumes are calculated based on the print dots of the respective printing nozzles.

6 Claims, 5 Drawing Sheets

(56) References Cited

U.S. PATENT DOCUMENTS

| | | |
|---|---|---|
| 2003/0085939 A1 | 5/2003 | Koitabashi et al. |
| 2006/0071955 A1 | 4/2006 | Arazaki |
| 2006/0125850 A1 | 6/2006 | Kim et al. |
| 2006/0146083 A1* | 7/2006 | Arazaki ................ B41J 2/0451 347/15 |
| 2006/0256157 A1 | 11/2006 | Kim et al. |
| 2006/0268034 A1 | 11/2006 | Lee et al. |
| 2007/0046706 A1 | 3/2007 | Kayahara et al. |
| 2011/0090276 A1 | 4/2011 | Hirano |
| 2011/0187785 A1 | 8/2011 | Inoue |
| 2012/0075373 A1 | 3/2012 | Ito |
| 2015/0224761 A1 | 8/2015 | Sato et al. |

FOREIGN PATENT DOCUMENTS

| | | |
|---|---|---|
| DE | 102016203917 A1 | 9/2017 |
| EP | 1157840 B1 | 7/2007 |

* cited by examiner

METHOD FOR COMPENSATING FOR DEFECTIVE PRINTING NOZZLES IN AN INKJET PRINTING MACHINE

CROSS-REFERENCE TO RELATED APPLICATION

This application claims the priority, under 35 U.S.C. § 119, of German application DE 10 2018 202 467.7, filed Feb. 19, 2018; the prior application is herewith incorporated by reference in its entirety.

BACKGROUND OF THE INVENTION

Field of the Invention

The invention lies in the technical field of digital printing. More particularly, the invention relates to a method for compensating for defective printing nozzles in an inkjet printing machine.

In general, inkjet printing machines comprise one or more print heads. Each print head has a plurality of printing nozzles. The inkjet printing machines use the nozzles for printing by expelling ink. These printing machines have nozzle plates with specific arrangements of the individual nozzles. As a result of a failure of an individual printing nozzle, a phenomenon also known as a "missing nozzle," areas in the individual color separation cannot be imaged by the dedicated nozzle. This results in areas without color, which may be visible as white lines. In a multicolor print, the respective color is missing at this location and the color values are distorted. Another aspect to be considered is that an individual nozzle does not jet along an ideal trajectory but may jet along a more or less deviant trajectory. Yet another aspect to be taken into consideration is the size of a jetted dot. Printing nozzles whose trajectories deviate too much may cause both a white line because they do not print at the intended location and they may create a so-called dark line because ink is applied to locations that are not intended to receive ink from the nozzle in question.

In general, printing nozzles that deviate too much, i.e. have an angled trajectory, are switched off and compensated for as missing nozzles. Thus a malfunctioning nozzle affects the quality of every printed document if the nozzle in question contributes to the print result. There are various causes for individual nozzle failures. A given failure may be a temporary failure or a permanent failure.

To reduce the effects on the printed image in particular in solid areas, a number of compensatory approaches have become known in the art.

One known approach to compensating for missing printing nozzles is to replace the missing printing nozzle by nozzles that print respective different colors that are used at the same location in the print. An example of this approach is disclosed in German published patent application DE 10 2014 219 965 A1. This approach is an attempt to approximate the missing printing color by printing a targeted and controlled combination of the colors that are still available. Advantages of this approach are that it does not require a redundancy of printing nozzles or print heads nor does the failure of neighboring printing nozzles present a problem. A major disadvantage of this compensatory approach is, however, that it may only be used in multicolor printing. In addition, the computer has to shoulder a greater computation and control workload to determine the required color combinations. Furthermore—depending on the color difference between the missing color and the color space that may still be printed by the remaining colors—the results of the printing operation may in fact deviate considerably from the intended color values.

Another approach to compensating for missing printing nozzles is to double the nozzle units that print the same color to use nozzle redundancy to compensate for individual missing nozzles. Examples of this approach are known from U.S. patent applications No. US 2006/0256157 A1 and US 2006/0268034 A1. While the approach is efficient, it is rather expensive and requires additional installation space. In addition, controlling the redundant units is a complex operation that may cause further problems.

Another known compensatory approach is to use printing nozzles from other systems for the compensation, i.e., to use multiple positionable print heads to print an image. If there are missing printing nozzles, the print heads are repositioned to replace the missing nozzle in the best possible way. Published patent application US 2012/0075373 A1 and U.S. Pat. No. 7,607,752 B2 disclose methods in which that approach is implemented. In fact, that approach also requires a redundancy of print heads that print the same color, which is problematic for the reasons indicated above.

The most common approach, which is also the approach the present invention deals with, is to cover the defect by adjacent printing nozzles that print the same color and belong to the same inkjet unit. That is to say that once an individual missing inkjet nozzle has been identified, the neighboring nozzles are actuated in such a way that the dot sizes they print are increased to cover the location of the missing nozzle to compensate for individual missing printing nozzles. This means that the image that the missing nozzle was intended to print is printed by the neighboring nozzles. In this way, white lines caused by individual defective nozzles may be prevented. Published patent application US 2006/0125850 A1 discloses a method and a printing machine that operate in accordance with this principle. However, the method has an effect on the printed image; problems occur in particular when multiple directly neighboring nozzles fail. Compensation over the space of two or more nozzles is difficult to implement.

Another application of the same approach is known from European Patent No. EP 1157840 B1. That document discloses to redistribute image values that are linked to the defective printing nozzle to one or more image values that are linked to non-defective printing nozzles and are immediately next to the defective printing nozzle and have the same color as the defective printing nozzle. However, in that case, too, there is a problem if more nozzles fail that are immediately next to one another.

A fundamental problem that occurs in all cases but is particularly obvious in this approach is that in reality, the positions of the printed dots of individual printing nozzles deviate. In this context, a print dot is the colored circle created by the ink drop. In reality, the positions of the print dots of the printing nozzles, measured in terms of their center, are not always equidistantly spaced apart from the print dots of neighboring printing nozzles. For constructional reasons or due to partial blocking, the print dots are more or less offset in directions perpendicular to or along the printing direction. In the case of the approach to compensate for missing printing nozzles by increasing the ink volume of the neighboring printing nozzles, this means that if the print dots of one or both neighboring printing nozzles are offset in directions away from the missing printing nozzle, an—albeit small—white line will be created despite the compensation. If in contrast the print dots are offset towards the missing printing nozzle, the result is overcompensation, i.e. a corresponding dark line is created. To eliminate this problem, the real positions of the print dots of all printing nozzles would have to be taken into consideration.

For this purpose, German published patent application DE 10 2016 203 917 A1 discloses a method wherein the ink drop volumes of the immediately neighboring compensatory nozzles are calculated as a function of their printing position. However, a disadvantage of this approach is that only the immediately neighboring nozzles are taken into consideration. Yet it has been found that for optimum missing nozzle compensation, not only need the immediately neighboring printing nozzles to jet an increased amount of ink, also referred to as compensation strength, but in addition, the neighboring printing nozzles that are farther away ought to print a corresponding reduced amount of ink, also referred to as dilution, to avoid overcompensation. Furthermore it has been found to be disadvantageous if the printing positions and the amplitudes, i.e. the volumes jetted by the further neighboring printing nozzles, are not taken into consideration in the case of compensation by increased ink volumes jetted by the neighboring printing nozzles, because defects in the halftone image are the result.

SUMMARY OF THE INVENTION

It is accordingly an object of the invention to provide an inkjet printing machine and a method of compensating for defective print nozzles which overcomes the above-mentioned and other disadvantages of the heretofore-known devices and methods of this general type.

With the foregoing and other objects in view there is provided, in accordance with the invention, a method of compensating for defective printing nozzles in an inkjet printing machine by way of a computer. The method comprises:

to compensate for defective printing nozzles, increasing an ink drop volume of neighboring printing nozzles;

determining real positions of print dots of all printing nozzles;

to compensate for a printing nozzle failure, calculating required ink drop volumes of respective neighboring printing nozzles for each printing nozzle as a function of the real positions of the print dots of the respective neighboring printing nozzles;

in addition to increased ink drop volumes of the respective neighboring printing nozzles, calculating reduced ink drop volumes for respective next but one printing nozzles; and calculating all ink drop volumes as a function of the print dots of the respective printing nozzles In other words, the above and related objects are attained by a method for compensating for failed printing nozzles in an inkjet printing machine by means of a computer, wherein defective printing nozzles are compensated for by an increased ink drop volume of neighboring printing nozzles and the real positions of the print dots of all printing nozzles are determined and, to compensate for a printing nozzle failure, the required ink drop volumes of the respective neighboring printing nozzles are calculated for every printing nozzle as a function of the real positions of the print dots of the respective neighboring printing nozzles. The method is characterized in that in addition to the increased ink drop volumes of the respective neighboring printing nozzles, reduced ink drop volumes are calculated for the respective next but one printing nozzles and all ink drop volumes are calculated as a function of the print dots of the respective printing nozzles. The main aspect of the method of the invention is that in addition to taking the real print dots of the adjacent printing nozzles into account in the calculation of the required ink drop volume, the same is done for the neighboring printing nozzles that are farther away, namely the next but one printing nozzles. The latter print a reduced volume of ink to provide partial compensation for the increased volume of ink jetted by the immediately neighboring printing nozzles in order to avoid overcompensation. For the latter, i.e. the next but one neighboring printing nozzles, the reduced ink drop volumes are likewise calculated as a function of their respective real print dots. Thus better compensation results are achieved because the calculated modified ink drop volumes of the relevant printing nozzles are optimally adapted to the real conditions.

In accordance with an added feature of the invention, the calculation of the increased and reduced ink drop volumes of the respective next and next but one printing nozzles, respectively, are made by the computer in such a way that initially, values of the increased and reduced ink drop volumes are calculated on the basis of optimum print dots of the next and next but one printing nozzles, respectively, and then dependencies of the increased and reduced ink drop volumes on the real print dots of the next and next but one printing nozzles, respectively, are determined on the basis of said values and then real values of the increased and reduced ink drop volumes are calculated by applying said determined dependencies. To take the real print dots of all printing nozzles into consideration in the calculation of the values of the respective increased and reduced ink drop volumes of the relevant neighboring printing nozzles, the first step naturally is to calculate standard values of the increased and reduced ink drop volumes. This is done by calculating the values of the increased and reduced ink drop volumes on the basis of respective optimum printing positions of the relevant printing nozzles. Of course, these optimum printing positions are known from the start. These values may then be used to calculate dependencies of the increased and reduced ink drop volumes, respectively, on the respective real printing positions. Such a dependency is, for instance, the fact that if the real dot of the immediately neighboring printing nozzle that needs to print an increased ink drop volume is closer to the missing printing nozzle, the increased ink drop volume needs to be smaller than if the real print dot is closer to the respective next but one neighboring printing nozzle. These dependencies may then be used to calculate a real value of the increased and reduced ink drop volumes.

In accordance with an additional feature of the invention, the determination of the dependencies of the increased and reduced ink drop volumes on the real print dots is achieved by measurements on inkjet test stands or by simulation. The determination of the dependencies of the increased and reduced ink drop volumes, respectively, on real printing positions implicitly includes a measurement of the real printing positions, which is done in reality on a test stand or by simulation.

In accordance with another feature of the invention, the calculation of the increased or reduced ink drop volumes of the respective next and next but one printing nozzles, respectively, by the computer is made additionally or alternatively by determining and applying the dependencies of the increased and reduced ink drop volumes on the amplitude of the respective printing nozzles. A further aspect is not only to determine the dependencies of the increased and reduced ink drop volumes on the real print dots but also the dependency on the respective amplitude of the respective printing nozzles. This dependency may be applied in addition to or as an alternative to applying the dependency on the real print dots. Applying it additionally improves the results, but increases the effort the method of the invention requires.

In accordance with a further feature of the invention, the dependencies of the increased and reduced ink drop volumes on the real print dots of the next and next but one printing nozzles, respectively, are described in the form of characteristic curves and are calculated by interpolation during the application. If the ink drop volume dependencies on the real print dots are not constant but dependent on the corresponding positional deviations, they may be described by characteristic curves. In such a case, during the application, missing values on the characteristic curves accordingly need to be calculated by interpolation.

A further preferred further development of the method of the invention in this context is that to calculate the increased and reduced ink drop volumes of the respective next and next but one printing nozzles, respectively, by the computer, interdependencies between the real print dots of the next and next but one printing nozzles, respectively, are taken into consideration. In addition, all modified ink drop volumes, namely the next, the next but one, and potentially further ink drop volumes are calculated as a function of all real print dots the ink drop volumina of the aforementioned printing nozzles. Thus for instance to calculate the immediately neighboring ink drop volume to the left of the corresponding printing nozzle that is immediately next to and to the left of the missing printing nozzle, it is not only its own real print dot thereof that is taken into consideration but to some extent also the real print dots of the further potentially relevant neighboring printing nozzles. This exact matching allows defects in the halftone, i.e. in the image that has already been screened and is to be generated by the inkjet printing machine, to be minimized.

In accordance with a concomitant feature of the invention, the calculation of the increased and reduced ink drop volumes by the computer is likewise made for and on the basis of the print dots and/or amplitude of the neighboring printing nozzles that are farther away. The terms "respective neighboring printing nozzles" and "respective next but one printing nozzles" need not be understood only to refer to the two immediately neighboring printing nozzles and the two respective next but one neighboring printing nozzles. Instead, they may also refer to groups of printing nozzles. It is possible, for instance, for a number of respective immediately neighboring printing nozzles, for instance the first three printing nozzles, to print an increased ink drop volume whereas a further group of for instance again three next but one printing nozzles that immediately follow print a reduced ink volume. The more neighboring printing nozzles are included in the pattern of immediately neighboring nozzles printing an increased ink volume and next but one neighboring printing nozzles printing a reduced ink volume, the more accurate the compensation method of the invention will be. However, a disadvantage is that the corresponding computational effort involved in the method of the invention increases in proportion.

Other features which are considered as characteristic for the invention are set forth in the appended claims.

Although the invention is illustrated and described herein as embodied in a method for compensating for defective printing nozzles in an inkjet printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
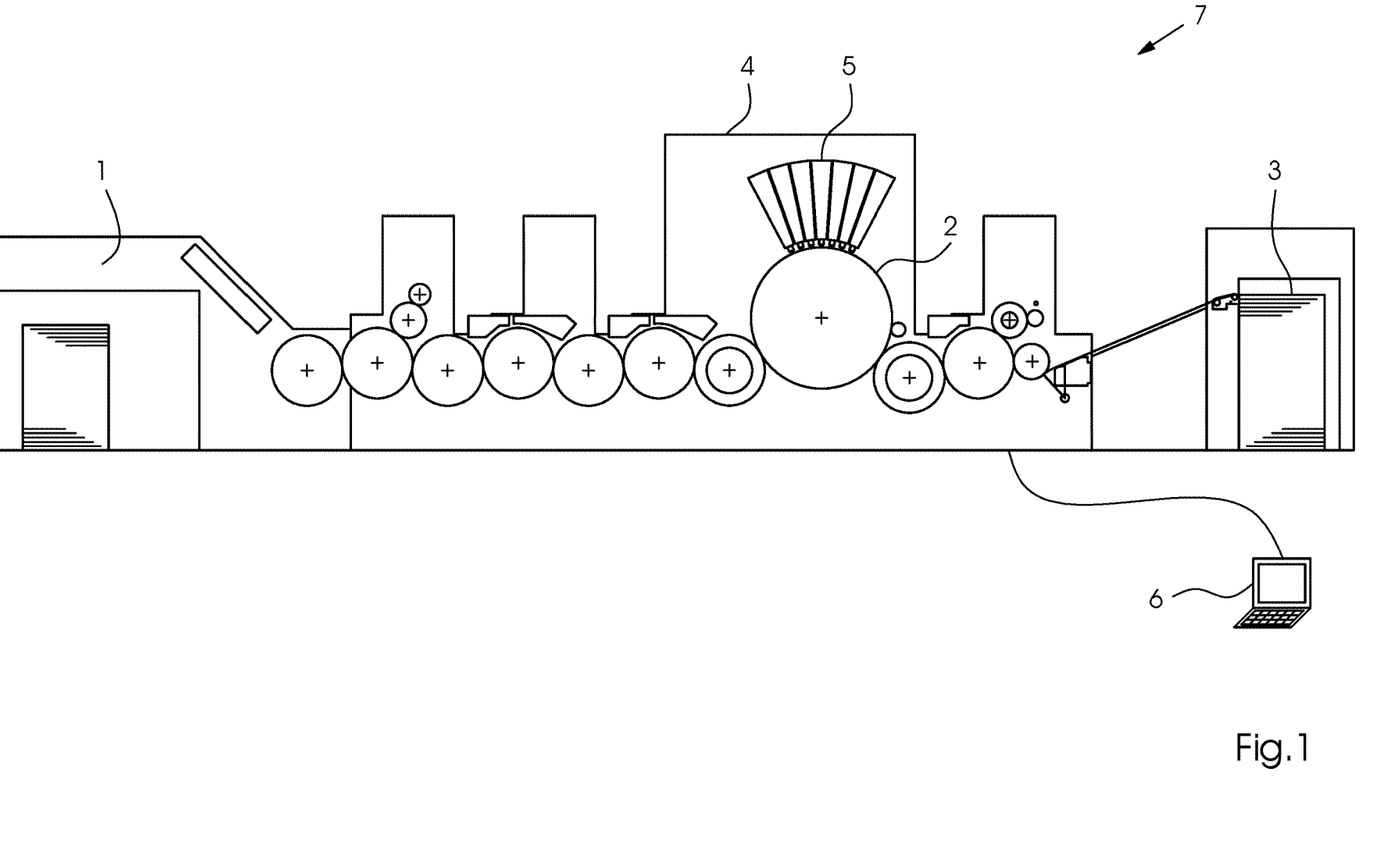
FIG. 1 is a schematic illustration of a system of a sheet-fed inkjet printing machine.
Figure 2:
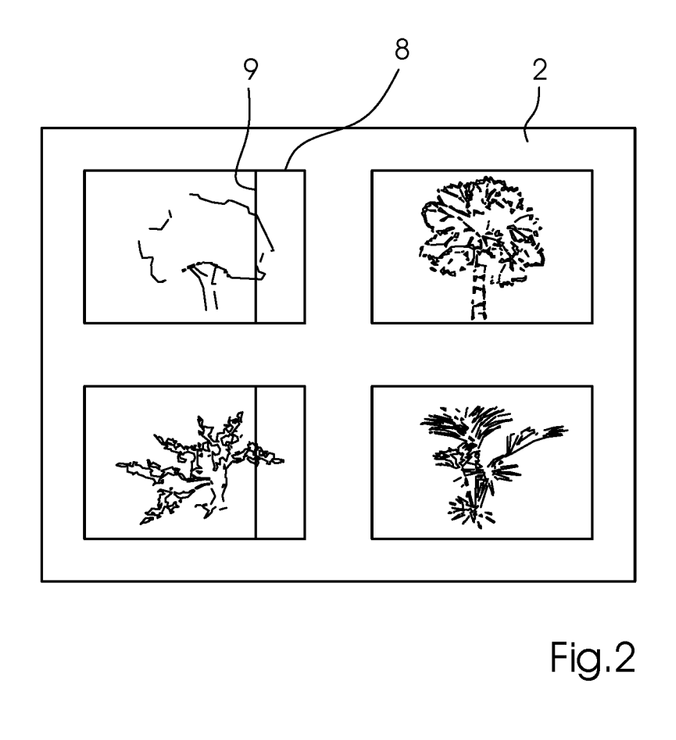
FIG. 2 illustrates a sample sheet exhibiting a stylized defect caused by a missing nozzle.

Referring now to the figures of the drawing in detail and first, particularly, to FIG. 1 thereof, the field of application of the preferred exemplary embodiment is an inkjet printing machine 7. FIG. 1 shows an example of the fundamental design of such a machine 7, including a feeder 1 for feeding the printing substrate 2 to the printing unit 4, where it receives an image printed by print heads 5, and a delivery 3. The machine is a sheet-fed inkjet printing machine 7 controlled by a control unit 6. While this printing machine 7 is in operation, individual printing nozzles in the print heads 5 in the printing unit 4 may fail as described above. Such failures result in white lines 9 or, in the case of multicolor printing, in distorted color values. An example of such a white line 9 in a printed image 8 is shown in FIG. 2.

Figure 3:
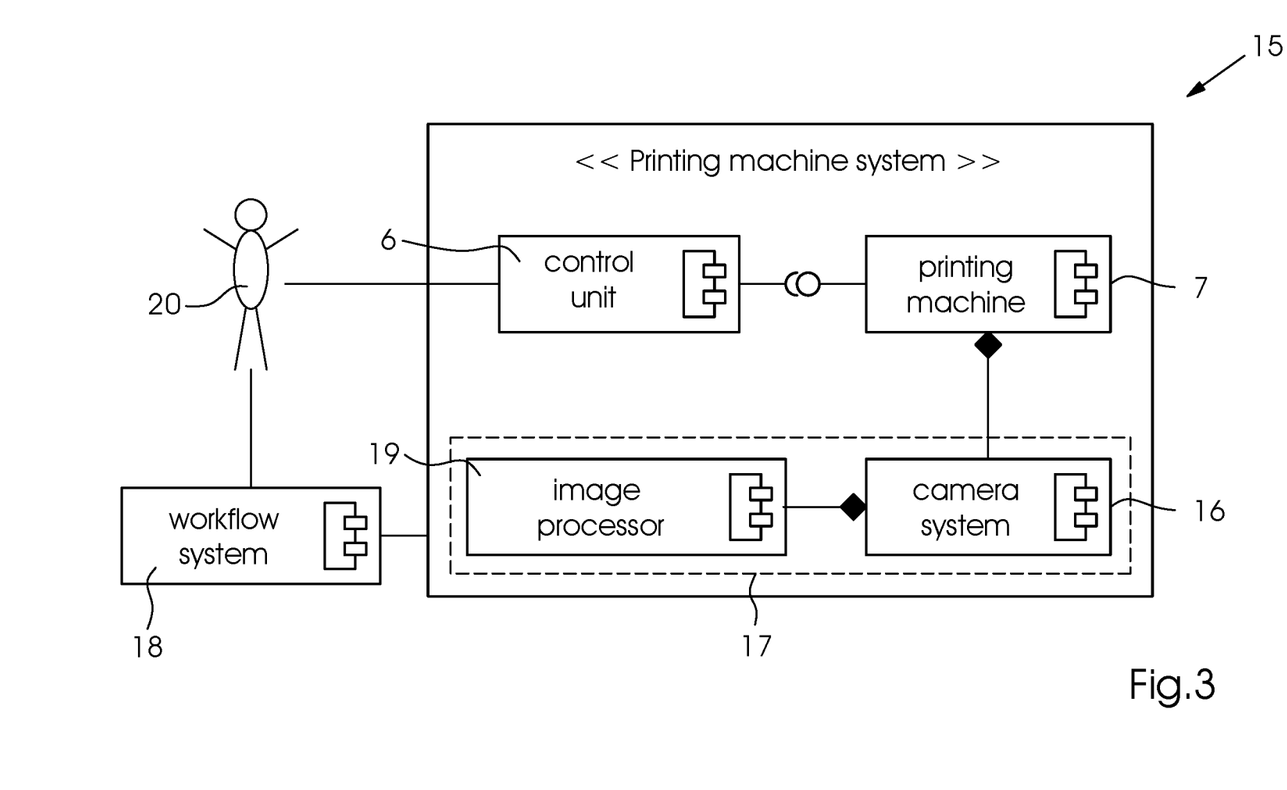
FIG. 3 illustrates an example of a printing machine system including an image recording system.

An example of a printing machine system 15 that may be used is shown in FIG. 3. In addition to the printing machine 7 itself, the system 15 consists of an image recording system 17, which comprises at least one image sensor, at least one camera 16 that is integrated into the printing machine 7. The at least one camera 16 records the images 8 generated by the printing machine 7 and transmits the data to a computer 6, 19 for analysis. This computer 6, 19 may be a separate computer, e.g. one or more dedicated image processors 19, or it may be identical with the control unit 6 of the printing machine 7. In addition, the entire process is controlled by a workflow system 18. The latter provides assistance to an operator 20; depending on the situation, this may for instance be the person processing the print job or the operator at the machine 7 itself.

Figure 5:
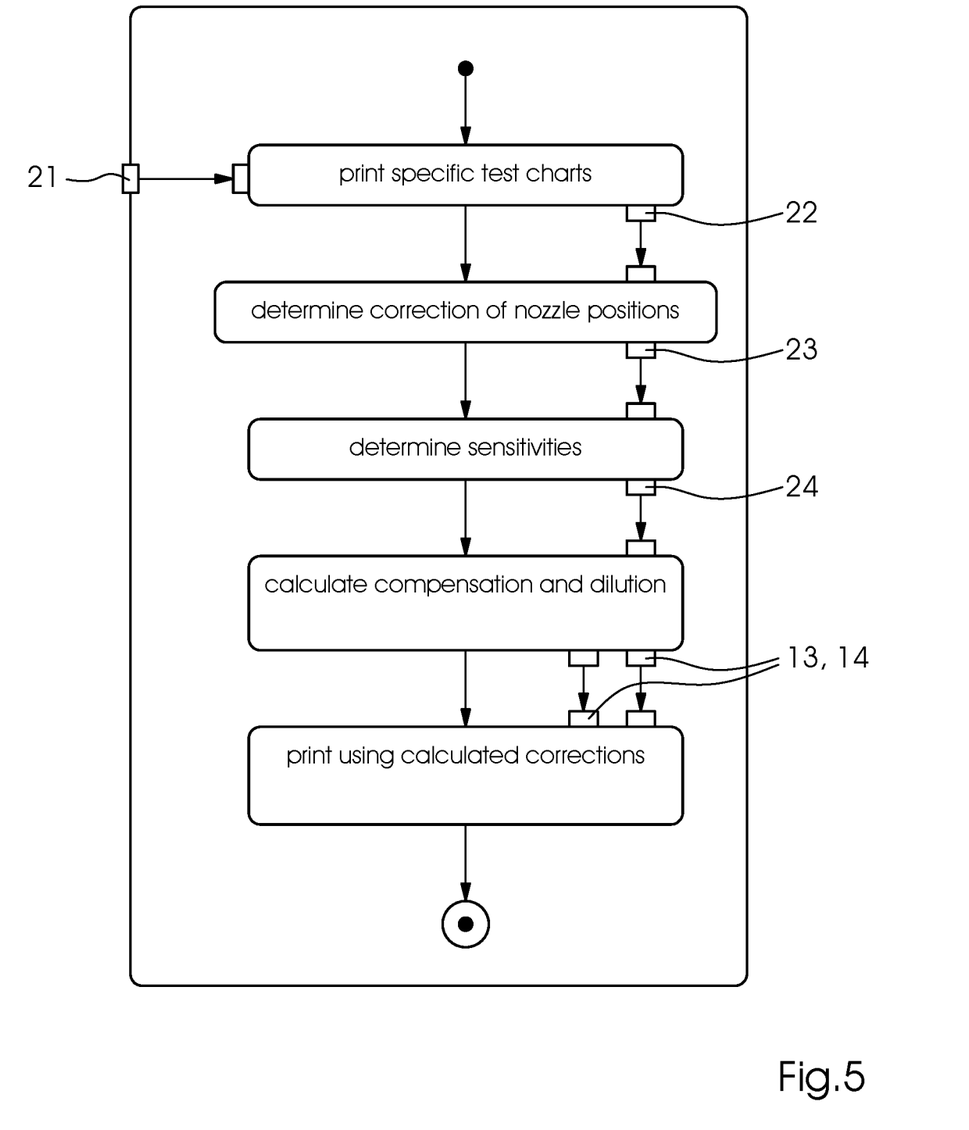
FIG. 5 is a flow chart of the method of the invention.

A preferred embodiment of the sequence of steps of the method of the invention is schematically shown in FIG. 5. In accordance with the method proposed herein, the computer 6, 17 selects the compensation strength 13 and the dilution 14 of the printing nozzles that contribute to the compensation as a function of the printing positions/print dots and/or amplitudes thereof.

The first step is to measure the jetting properties of the printing nozzles such as the printing positions, amplitudes, and degrees of variance of the printing nozzles in the course of a defective nozzle detection process. This is done by printing and analyzing control elements such as specific printing nozzle test charts 21. These test charts 21 are then recorded and digitized by the image recording system 17. On the basis of the printed and recorded printing nozzle test charts 22, a decision is made whether defective nozzles 11 are to be switched off; in addition, all the data required for an implementation of the described compensation method are now known.

Figure 4:
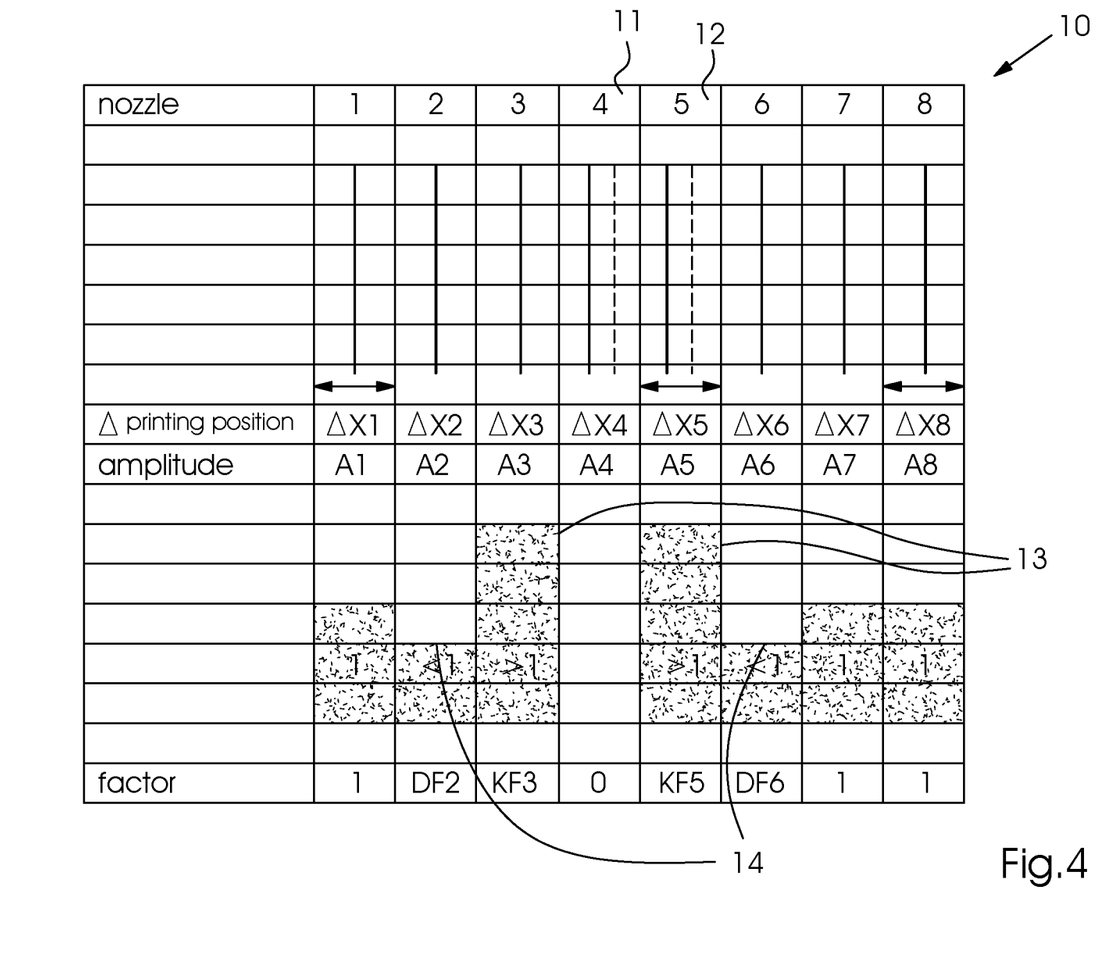
FIG. 4 illustrates an example of the position and calculation of the ink drop volumes.

In a second step, the default compensation strengths, which can also be considered as compensation factors $KF_{std}$ and dilution factors $DF_{std}$ are determined. As explained above, the immediate neighboring nozzles 13 are amplified (compensation strength) whereas the next but one neighboring nozzles 14 are diluted (dilution). This is shown in FIG. 4 in the form of a schematic overview 10. In the illustrated example, a printing nozzle 4 is switched off because it jets at an angle, i.e. its print dot deviates to a considerable extent. This defective printing nozzle 11 is compensated for by printing nozzles 3 and 5, with KF>1 while nozzles 2, 6 are diluted with DF<1. Printing nozzle 5 likewise jets at an angle, i.e. has a deviated print dot 12, but may still be used in the printing operation and thus remains activated.

To determine $KF_{std}$ and $DF_{std}$, specific printing nozzle test charts 21 are printed with nozzles that are artificially switched off while area coverage, compensation factor (KF3=KF5) and dilution factor (DF2=DF6) of the neighboring printing nozzles 13, 14 are varied. The optimum range/optimum values of these parameters are determined by visually examining the image 8 to see whether the defective printing nozzles 11 that have been compensated for in the printed image 8 can still be visually recognized. The values that are determined in this way on average correspond to the average, correct print dots 23.

The next step is to determine the sensitivities 24, i.e. dependencies, $a_{xy}$, of the factors $KF_3$ and $FK_5$ as well as $DF_2$ and $DF_6$ on the print dots 23 of the printing nozzles $\Delta X_2$ to $\Delta X_6$ for compensation 13 that is visually no longer discernible. This may be done on an inkjet test stand or by simulation. In the example shown in FIG. 4, in which compensation 13 for printing nozzle 4 is implemented, the sensitivities are as follows:

| | | | |
|---|---|---|---|
| $a_{22} = DF_2/\Delta X_2$ | $a_{23} = \Delta DF_2/\Delta X_3$ | $a_{25} = \Delta DF_2/\Delta X_5$ | $a_{26} = \Delta DF_2/\Delta X_6$ |
| $a_{32} = \Delta KF_3/\Delta X_2$ | $a_{33} = \Delta KF_3/\Delta X_3$ | $a_{34} = \Delta KF_3/\Delta X_4$ | $a_{36} = \Delta KF_3/\Delta X_6$ |
| $a_{52} = \Delta KF_5/\Delta X_2$ | $a_{53} = \Delta KF_5/\Delta X_3$ | $a_{54} = \Delta KF_5/\Delta X_4$ | $a_{56} = \Delta KF_5/\Delta X_6$ |
| $a_{62} = \Delta DF_6/\Delta X_2$ | $a_{63} = \Delta DF_6/\Delta X_3$ | $a_{65} = \Delta DF_6/\Delta X_5$ | $a_{66} = \Delta DF_6/\Delta X_6$ |

Subsequently, the last step of the method is to compensate for the defective printing nozzles 11. Once printing nozzle 4 has been switched off, the printing nozzle positions or rather the deviations thereof from the target positions of the print dots that are known from the measurement of the printing positions of printing nozzles 4 to 6 may be used to calculate compensation factors $KF_3$ and $KF_5$ and dilution factors $DF_2$ and $DF_6$, which may then be applied. Depending on the printing positions of the contributing printing nozzles, these factors no longer correspond to the standard factors.

$$DF_2 = DF_{std} + a_{22}*\Delta X_2 + a_{23}*X_3 + a_{25}*\Delta X_5 + a_{26}*\Delta X_6$$

$$KF_2 = KF_{std} + a_{32}*\Delta X_3 + a_{33}*\Delta X_3 + a_{35}*\Delta X_5 + a_{36}*\Delta X_6$$

... etc.

The advantages of the method of the invention are that all defective printing nozzles 11 that have been switched off are correctly compensated for, no white lines 9 remain, and no dark lines are created. This more than compensates for potential disadvantages such as an increased computational effort including and increased memory space requirements to determine the dependencies.

In a further preferred embodiment, it is analogously possible to determine the dependencies $KF_{3,5}$ and $DF_{2,6}$ on the amplitudes $A_x$ of printing nozzles 2 to 6 and the combinations thereof and to take these dependencies into consideration when the defective printing nozzles 11 are compensated for.

Another approach to a solution is an iterative application of the sigma-delta process, which is carried out analogously to the density compensation, taking into consideration the print dots and/or amplitudes and/or variances.

Further preferred embodiments comprise:

The method of the invention may be simplified by making certain assumptions, for instance by assuming symmetry or $DF_2 = u*KF_3$, u being a linear factor.

The method of the invention may additionally be extended to include further neighboring nozzles such as nozzles 1 and 7 in the example shown in FIG. 4 and even further neighboring printing nozzle pairs.

If the sensitivities 14 are not constant but depend on the print dot deviations, they may be described by characteristic curves and calculated by interpolation in the application.

The method that has been described so far does not factor in interdependencies between the deviations. If these are present, they need to be determined using more complex methods such as DoE.

Determination of the position-dependent factors by the formation of a model.

Printing nozzle 11, which jets at an angle and is factually defective. is not switched off and compensation factors $KF_x$ for the printing nozzles 13, 14 neighboring the white line 9 and dilution factors are determined analogously with the method of the invention. In this case, the influence of the printing nozzle 11 that jets at an angle and is factually defective of course needs to be taken into consideration.

The following is a summary list of reference numerals and the corresponding structure used in the above description of the invention:

1 feeder
2 printing substrate
3 delivery
4 inkjet printing unit
5 inkjet print head
6 computer
7 inkjet printing machine
8 entire print
9 white line
10 schematic overview
11 defective printing nozzle that has been switched off
12 active printing nozzle that prints incorrectly
13 neighboring printing nozzles jetting an increased volume of ink (compensation)
14 neighboring printing nozzles jetting a reduced volume of ink (dilution)
15 printing machine system
16 camera
17 image recording system
18 workflow system
19 image processor
20 operator
21 printing nozzle test chart
22 printed and recorded test chart
23 correct print dots
24 determined sensitivities

The invention claimed is:

1. A method of compensating for defective printing nozzles in an inkjet printing machine by way of a computer, the method comprising:
   to compensate for defective printing nozzles, increasing an ink drop volume of neighboring printing nozzles;
   determining real positions of print dots of all printing nozzles;
   to compensate for a printing nozzle failure, calculating required ink drop volumes of respective neighboring printing nozzles for each printing nozzle as a function of the real positions of the print dots of the respective neighboring printing nozzles;
   in addition to increased ink drop volumes of the respective neighboring printing nozzles, calculating reduced ink drop volumes for respective next but one printing nozzles; and
   calculating all ink drop volumes as a function of the print dots of the respective printing nozzles;
   calculating the increased and reduced ink drop volumes of the respective next and next but one printing nozzles, respectively, with the computer by initially calculating values of the increased and reduced ink drop volumes on a basis of optimum print dots of the next and next but one printing nozzles, respectively, and subsequently determining dependencies of the increased and reduced ink drop volumes on the real print dots of the next and next but one printing nozzles, respectively, on a basis of calculated values, and subsequently calculating real values of the increased and reduced ink drop volumes by applying the determined dependencies.

2. The method according to claim 1, which comprises determining the dependencies of the increased and reduced ink drop volumes on the real print dots by taking measurements on inkjet test stands or by simulation.

3. The method according to claim 1, which comprises calculating with the computer the increased and reduced ink drop volumes of the respective next and next but one printing nozzles additionally or alternatively by determining and applying the dependencies of the increased and reduced ink drop volumes on the amplitude of the respective printing nozzles.

4. The method according to claim 1, which comprises describing the dependencies of the increased and reduced ink drop volumes on the real print dots of the next and next but one printing nozzles, respectively, in characteristic curves and calculating the dependencies during the application by the computer by interpolation.

5. The method according to claim 1, which comprises taking into consideration interdependencies between the real print dots of the next and next but one printing nozzles, respectively, for calculating the increased and reduced ink drop volumes of the respective next and next but one printing nozzles, respectively.

6. The method according to claim 1, which comprises calculating with the computer the increased and reduced ink drop volumes of the respective next and next but one printing nozzles, respectively, also for and based on the print dots and/or the amplitude of the neighboring printing nozzles that are farther away.

* * * * *